(No Model.)
J. S. BUTLER.
GANG PLOW.
No. 498,741. Patented May 30, 1893.
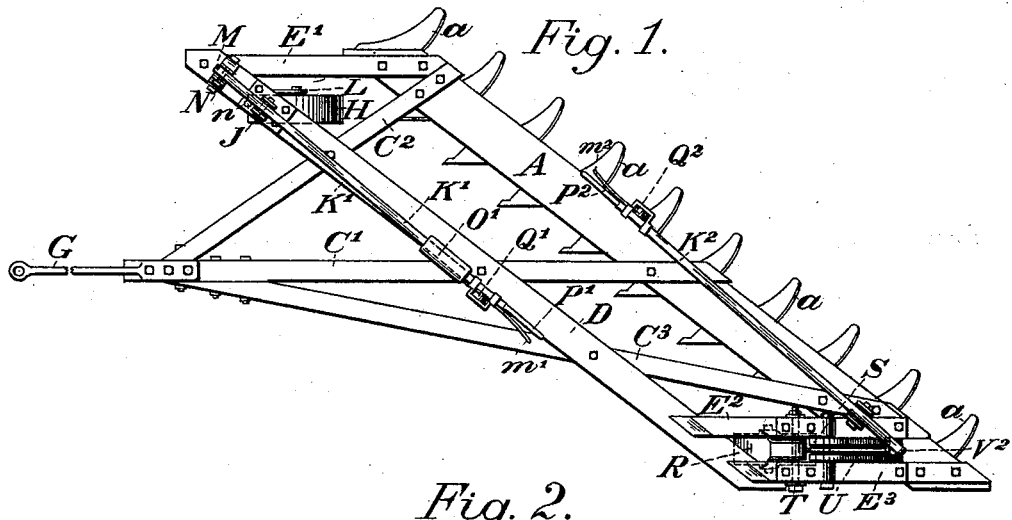
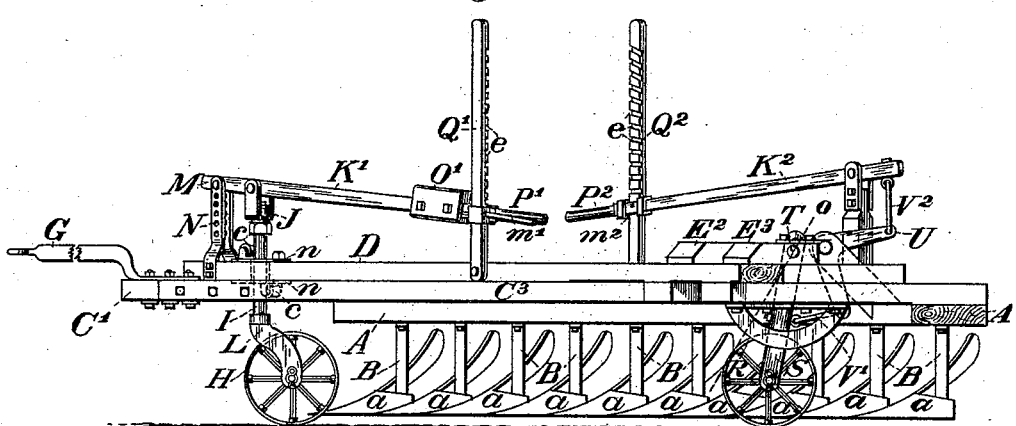
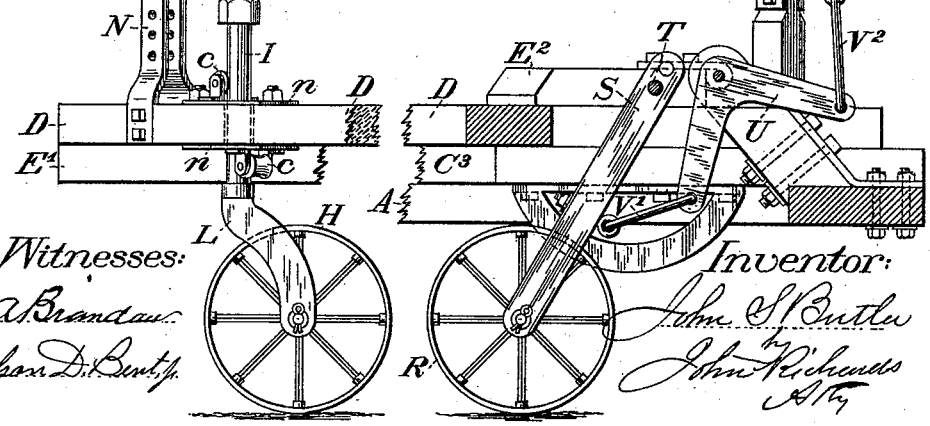
Witnesses:
E. A. Brandau
Wilson D. Buntz
Inventor:
John S. Butler
by John Richards
Att'y

UNITED STATES PATENT OFFICE.

JOHN S. BUTLER, OF TEHAMA, CALIFORNIA.

GANG-PLOW.

SPECIFICATION forming part of Letters Patent No. 498,741, dated May 30, 1893.

Application filed July 16, 1892. Serial No. 440,261. (No model.)

*To all whom it may concern:*

Be it known that I, JOHN S. BUTLER, a citizen of the United States, residing at Tehama, county of Tehama, and State of California, have invented certain new and useful Improvements in Gang-Plows for Agricultural Purposes; and I hereby declare the following specification, with the drawings therewith, to be a full and exact description of my invention, and also the mode of constructing and operating the same.

My invention relates to gangs of agricultural plows to be drawn by steam, animal, or other power, and to methods of operating the same, and consists in devices for elevating, independently or conjointly, the ends of the main plow beam and the plows thereto attached; and in so counterweighting and arranging the elevating mechanism that the plows can be raised out of the earth by a single attendant.

My invention also includes the method of mounting the rear, or trailing bearing wheel, so that the draft power applied to the machine can be utilized in raising the rear end of the machine and main plow beam, and in various other details which will be more particularly pointed out and explained in connection with the drawings, in which—

Figure 1 is a plan view on top of a gang plow provided with my improvements. Fig. 2 is a side view of the same, and Figs. 3 and 4 are enlarged details of the lifting mechanism, to raise or depress the machine and the plows.

Similar letters of reference are employed on the different figures to indicate corresponding parts thereof.

To raise, or disengage, the plows of a gang when they are in progress through the earth, calls for the application of a force far in excess of what either the strength, or weight of a man can exert, and still greater force when the plows are stopped in their buried or working position; but as comparatively little force is required to depress, or engage, the plows, and no force whatever to keep them buried, or engaged when moving forward under proper adjustment, I take advantage of this circumstance and apply counterbalance to the forward or leading end of the machine, their gravity compensating the weight of the plow beam and connected parts, so that an attendant in raising the plows has no force to exert other than to oppose the down draft of the plows, due to their position below the line of draft, and in case of raising the rear, or following end of the machine, I apply in part the tractive force to assist in raising that end. To do this I mount the plows *a* on a main plow beam A by means of strong standards B, as shown in Figs. 1 and 2. This main beam A is set diagonal to the line of movement, which corresponds to the beam C', so the plows *a* will be equally spaced, both transverse to and also in the line of movement in the usual manner of their arrangement, when operated in gangs.

Parallel to the main plow beam A, I place a second beam D, and from this connect to the main beam A by the cross rails E', E², E³ and the diagonal rails C², C³, the latter acting as braces compensating for diagonal strains. Draft power is applied at the tongue G, and may be by a steam traction engine, animal power, or other means of supplying the required force to draw the plows.

To regulate the depth at which the plows operate, and to raise and lower them when they are to be set at work, or move free of the ground, I employ the following means: Near the forward, or leading, end of the beam D, I place a bearing wheel H mounted on a swiveling stem I, which passes loosely through a flange sleeve in the beam D and is attached at the top, by a shackle J, to the lever K'. The stem I, with its forked extension L, is free to turn in any direction, so the wheel H may lead in any course, as in turning angles, or corners, at the end of furrows. The lever K' is attached at M to the beam D by the stirrup N, so the weight of the beam, and also the down strain of the plows *a*, will fall on the stem I and wheel H. To compensate this weight and strain, I place a weight O' on the lever K' so proportionate to the opposing weight and strain that the difference is easily overcome by an attendant moving the handle P' up or down as the forward plows *a* are to be thrown out or in. The lever K' slides up or down on the standard Q', and is provided with a detent *m'* which fits into the notches *e*, so the pitch, or depth, at which the plows *a* operate, can be adjusted at pleasure by an attendant. To prevent excessive friction on the stem I where it passes through the beam D, I place lugs $n$ $n$ on the top and bottom of the beam, in which rollers $c$ $c$ are set in the line of principal strain, and thus secure a free movement of the stem I.

At the rear end of the machine I place a second bearing wheel R mounted in a swinging frame, or support S, pivoted at T, on the cross beams $E^2$ $E^3$. This frame, or support S, is swung backward and forward by means of a bell crank U connected to the frame S by the link V', and to the lever $K^2$ by the link $V^2$. The action of this lever $K^2$ is similar to the one K', being provided with a standard $Q^2$, having a rack $e$, and detent as before described. When the lever $K^2$ is raised the frame S swings forward to the position shown in Fig. 3, and indicated by the dotted line $o$, Fig. 2. The object of this swing frame S is to assist, by reason of its diagonal position, and the strain of the draft, in raising the rear end of the machine. In this diagonal position of the frame S the rear plows are buried, or in their working position, but if the lever $K^2$ is depressed, as shown in Fig. 2, then the rear end of the machine is raised and the plows $a$ are held clear of the ground, as shown in Fig. 2, a counterweight not being necessary, as in case of lever K', other details, including the standard $Q^2$, detent $m^2$, and handle $P^2$, being the same as in the case of the lever K'. As, however, the strength of an attendant is not always sufficient to raise the rear end of the machine and disengage the plows $a$, especially in deep plowing or in hard ground, I arrange the swing frame S, pivoted as before described, so that when plowing it will stand in the position shown in Fig. 4, and as indicated by the dotted line $o$, Fig. 2.

It will be understood that when the machine is moving forward there will be a resisting force on the wheel R, tending to swing the frame S back in the manner of a strut, and raise the machine to position shown in Fig. 2, and this force, connected with the strength of an attendant, applied at the handle $P^2$ is always sufficient to raise the rear end of the machine and disengage the plows $a$. Either lever may be operated independently of the other in elevating, or depressing the plows, at either the forward or rear ends, at the will of the attendant.

Having thus described the nature and objects of my invention, with the manner of constructing and operating the same, what I claim as new, and desire to secure by Letters Patent, is—

1. In a gang plow, a series of plows mounted on a diagonal main beam, a parallel front beam connected thereto by means of cross rails as described, a front bearing wheel mounted on a swiveling and adjustable stem having a shackle at the top, a counter-weighted lever pivotally attached to said shackle and also adjustably pivoted to a stirrup on the plow frame, a notched standard on the plow frame on which standard the counter-weighted lever is adjustable up and down, together with a detent on said lever for engaging the notches of the standard and holding the lever in any desired position, substantially as described.

2. In a gang plow, a series of plows mounted on a diagonal main beam, a parallel front beam connected thereto by means of cross rails, as herein described; front and rear bearing wheels attached to these beams, and operated by levers provided with counterweights to balance the gravity of the machine so that either end can be elevated, and the plows raised out of the ground by an attendant, in the manner and for the purposes substantially as herein specified and shown.

3. In a gang plow, a series of plows attached to a vertically-adjustable main frame; front and rear bearing wheels, as herein described, the front wheel receiving the whole weight of the forward end of the machine by means of a counter-weighted lever attached thereto, and the other bearing wheel by a swing frame operated by the lever, the swing frame arranged to act as a strut beneath the machine, so the tractive force can be employed in raising the main frame and plows at that end, in the manner substantially, and for the purposes specified.

4. In a gang plow, a series of plows attached to a main beam, a rear or trailing bearing wheel R, a swinging frame or support S in which the wheel R is mounted, said support being pivoted at T upon the cross beams of the plow frame, a bell crank U connected to the frame S by a link V' and to the lever $K^2$ by the link $V^2$, the lever $K^2$ pivoted upon a suitable support, the standard $Q^2$ having the rack $e$ and the detent on the lever $K^2$ which operates in conjunction with the notches on the standard $V^2$ for the purpose of enabling the lever to be held in any desired position, substantially as described.

In testimony whereof I have hereunto affixed my signature in the presence of two witnesses.

JOHN S. BUTLER.

Witnesses:
G. W. WESTLAKE,
C. E. FISH.